United States Patent
Bulan et al.

(10) Patent No.: US 10,224,552 B2
(45) Date of Patent: Mar. 5, 2019

(54) GAS DIFFUSION ELECTRODE AND PROCESS FOR PRODUCTION THEREOF

(75) Inventors: Andreas Bulan, Langenfeld (DE); Jürgen Kintrup, Leverkusen (DE); Rainer Weber, Odenthal (DE)

(73) Assignee: Covestro AG, Leverkusen (DE)

(*) Notice: Subject to any disclaimer, the term of this patent is extended or adjusted under 35 U.S.C. 154(b) by 1443 days.

(21) Appl. No.: 13/160,581

(22) Filed: Jun. 15, 2011

(65) Prior Publication Data
US 2011/0311903 A1    Dec. 22, 2011

(30) Foreign Application Priority Data

Jun. 17, 2010 (DE) .......................... 10 2010 030 203

(51) Int. Cl.
| | | |
|---|---|---|
| H01M 4/86 | (2006.01) | |
| H01M 8/02 | (2016.01) | |
| H01M 8/08 | (2016.01) | |
| H01M 12/06 | (2006.01) | |
| H01M 4/92 | (2006.01) | |
| C25B 11/03 | (2006.01) | |
| C25B 1/46 | (2006.01) | |

(52) U.S. Cl.
CPC ................. *H01M 4/92* (2013.01); *C25B 1/46* (2013.01); *C25B 11/035* (2013.01); *H01M 4/8605* (2013.01); *H01M 4/8652* (2013.01)

(58) Field of Classification Search
None
See application file for complete search history.

(56) References Cited

U.S. PATENT DOCUMENTS

| | | | |
|---|---|---|---|
| 5,693,202 A | 12/1997 | Gestermann et al. | |
| 5,861,222 A | 1/1999 | Fischer et al. | |
| 6,503,655 B1 | 1/2003 | Petricevic et al. | |
| 6,838,408 B2 | 1/2005 | Bulan et al. | |
| 7,226,885 B2 | 6/2007 | Janowitz et al. | |
| 2004/0072683 A1 | 4/2004 | Kodas et al. | |
| 2004/0152588 A1 | 8/2004 | Janowitz et al. | |
| 2004/0182695 A1 | 9/2004 | Bulan et al. | |
| 2005/0238948 A1 | 10/2005 | Mei et al. | |
| 2006/0263232 A1* | 11/2006 | Bulan .............................. | 419/9 |
| 2007/0148531 A1 | 6/2007 | Yoshizawa et al. | |
| 2008/0113256 A1* | 5/2008 | Reshetenko ............ | B32B 37/10 |
| | | | 429/483 |
| 2008/0261097 A1 | 10/2008 | Kubota et al. | |
| 2008/0292931 A1 | 11/2008 | Schwartz et al. | |
| 2010/0124686 A1 | 5/2010 | Morioka | |
| 2010/0261089 A1 | 10/2010 | Morioka et al. | |

FOREIGN PATENT DOCUMENTS

| | | |
|---|---|---|
| DE | 1219553 B | 6/1966 |
| DE | 3710168 A1 | 10/1988 |
| DE | 4444114 A1 | 9/1996 |
| DE | 10130441 A1 | 3/2003 |
| DE | 10148599 A1 | 4/2003 |
| DE | 102005023615 A1 | 11/2006 |
| EP | 144002 A2 | 6/1985 |
| EP | 0797265 A2 | 9/1997 |
| EP | 2164122 A1 | 3/2010 |
| EP | 2172999 A1 | 4/2010 |
| JP | 2001202970 A * | 7/2001 |
| WO | WO-2001/057290 A1 | 8/2001 |
| WO | WO-2002/18675 A2 | 3/2002 |
| WO | WO-03/004726 A2 | 1/2003 |
| WO | WO-2007/081538 A2 | 7/2007 |

OTHER PUBLICATIONS

Bi Dault, F., et al., "An improved cathode for alkaline fuel cells," International Journal of Hydrogen Energy (2010), vol. 35, pp. 1783-1788.

Lipp, L., et al., "Peroxide formation in a zero-gap chlor-alkali cell with an oxygen-depolarized cathode," Journal of Applied Electrochemistry (2005), vol. 35, pp. 1015-1024.

Moussallem, I., et al., "Chlor-alkali electrolysis with oxygen depolarized cathodes: history, present status and future prospects," J Appl Electrochem (2008), vol. 38, pp. 1177-1194.

* cited by examiner

*Primary Examiner* — Stephen J Essex
(74) *Attorney, Agent, or Firm* — Drinker Biddle & Reath LLP

(57) ABSTRACT

The present invention relates to a gas diffusion electrode that includes an electrically conductive carrier, and a porous coating based on an electrochemically active catalyst and a hydrophobic material, wherein the electrode has a first side facing an oxygen-containing gas and a second side facing an alkaline electrolyte, wherein the catalyst comprises a noble metal as a catalytically active component, wherein the hydrophobic material comprises a hydrophobic polymer, and wherein the coating comprising the catalyst has a pore volume from 10 to 500 mm$^3$/g, and a pore diameter in the range from 100 to 10,000 nm.

20 Claims, No Drawings

GAS DIFFUSION ELECTRODE AND PROCESS FOR PRODUCTION THEREOF

CROSS-REFERENCE TO RELATED APPLICATIONS

This application claims benefit to German Patent Application No, 10 2010 030 203.1, filed Jun. 17, 2010, which is incorporated herein by reference in its entirety for all useful purposes.

BACKGROUND OF THE INVENTION

The invention relates to a gas diffusion electrode, especially to an oxygen-consuming electrode for the reduction of oxygen under alkaline conditions, especially suitable for use in chloralkali electrolysis, with a new specific catalyst morphology and to an electrolysis apparatus. The invention further relates to a production process for the oxygen-consuming electrode and to the use thereof in chloralkali electrolysis or fuel cell technology.

The invention proceeds from oxygen-consuming electrodes known per se, which are configured as gas diffusion electrodes and typically comprise an electrically conductive carrier and a gas diffusion layer and a catalytically active component.

Oxygen-consuming electrodes, referred to hereinafter as OCEs, are one form of gas diffusion electrodes. Gas diffusion electrodes are electrodes in which the three states of matter—solid, liquid and gaseous—are in contact with one another, and the solid, electron-conducting catalyst catalyses an electrochemical reaction between the liquid and gaseous phases. The solid catalyst is typically pressed to a porous film, typically with a thickness of more than 200 μm.

Various proposals for operation of the oxygen-consuming electrodes in electrolysis cells on the industrial scale are known in principle from the prior art. The basic idea is to replace the hydrogen-evolving cathode of the electrolysis (for example in the chloralkali electrolysis) with the oxygen-consuming electrode (cathode). An overview of the possible cell designs and solutions can be found in the publication by Moussallem et al. "Chlor-Alkali Electrolysis with Oxygen Depolarized Cathodes: History, Present Status and Future Prospects", J. Appl. Electrochem. 38 (2008) 1177-1194.

The oxygen-consuming electrode—also referred to hereinafter as OCE for short—has to meet a series of fundamental requirements to be useable in industrial electrolysers. For instance, the catalyst and all other materials used have to be chemically stable toward approx. 32% by weight sodium hydroxide solution and toward pure oxygen at a temperature of typically 80-90° C. Similarly, a high degree of mechanical stability is required, such that the electrodes can be installed and operated in electrolysers with a size typically more than 2 m² in area (industrial scale). Further properties are: high electrical conductivity, low layer thickness, high internal surface area and high electrochemical activity of the electrocatalyst. Suitable hydrophobic and hydrophilic pores and a corresponding pore structure for conduction of gas and electrolyte are likewise necessary, as is such imperviosity that gas and liquid space remain separate from one another. The long-term stability and low production costs are further particular requirements on an industrially useable oxygen-consuming electrode.

A further direction of development for utilization of OCE technology in chloralkali electrolysis is that of zero-gap technology. In this case, the OCE is in direct contact with the ion exchange membrane, which separates the anode space from the cathode space in the electrolysis cell. No gap for sodium hydroxide solution is present here. This arrangement is typically also employed in fuel cell technology. A disadvantage here is that sodium hydroxide solution which forms has to be passed through the OCE to the gas side, and then flows downward on the OCE. In the course of this, there must not be any blockage of the pores in the OCE by the sodium hydroxide solution, or crystallization of sodium hydroxide solution in the pores. It has been found that very high sodium hydroxide solution concentrations can also arise here, in which case the ion exchange membrane does not have long-term stability to these high concentrations (Lipp et al., J. Appl. Electrochem. 35 (2005)1015—Los Alamos National Laboratory "Peroxide formation during chlor-alkali electrolysis with carbon-based ODC").

An important prerequisite for the operation of gas diffusion electrodes is that both the liquid and gaseous phases may be present at the same time in the pore system of the electrode. How this is to be achieved is shown by the Young-Laplace equation:

$$p = \frac{2\sigma \cos\theta}{r}$$

The gas pressure p is thus related to the liquid in the pore system via the pore radius r, the surface tension σ of the liquid and the wetting angle Θ. However, this equation should be understood merely as a guide because too many parameters are unknown or difficult to determine:

For the surface tension, the difference of the surface tension of the solid and of the liquid has to be considered. The surface tension of catalysts, for example platinum on carbon or silver, however, are barely measurable.

The wetting angle can be determined on a flat surface. A single pore, in contrast, cannot be examined since the pore system of the entire electrode would be determined in this case.

The wetting angle also changes under the influence of the electrical field and the temperature; neither can be measured within the electrode.

To create gas and liquid spaces in an OCE, it is necessary to generate pores which have different pore radii or different surface tensions. In addition to the wetting properties, the OCEs must have a good electrical conductivity, in order that the electrons can be transported with a minimum ohmic resistance.

In chloralkali electrolysis in the finite gap arrangement, for example, an OCE separates an electrolyte space from a gas space. In this case, as described above, gas must not pass from the gas space into the electrolyte space, nor electrolyte from the electrolyte space into the gas space. In industrial electrolysers, the oxygen-consuming cathode should withstand the hydrostatic pressure which exists at the base of the industrial electrolysis cell, for example of 170 mbar. Since a gas diffusion electrode has a pore system, a small amount of liquid always passes into the gas space, and gas into the liquid space. The amount depends on the construction of the cell of the electrolyser. The OCE should be impervious at a pressure difference between the gas space and the liquid space in the range of 10-60 mbar. What is meant here by "impervious" is that passage of gas bubbles into the electrolyte space is observable with the naked eye. "Liquid-impervious" means that an amount of liquid of not more than 10 g/(h*cm²) passes through the OCE (where g represents the mass of liquid, h represents one hour and cm² represents the geometric electrode surface area). When, however, too much liquid passes through the OCE, it can flow downward only on the side facing the gas side. In this case, a liquid film can form, which hinders the access of gas to the OCE and thus has an extreme adverse effect on the performance of the OCE (oxygen under-supply). When too much gas enters the electrolyte space, it has to be possible to conduct the gas bubbles out of the electrolyte space. In each case, the gas bubbles screen off part of the electrode area and of the membrane area, which leads to a current density shift and hence, in galvanostatic operation of the cell, to a local increase in current density and to an undesirable increase in cell voltage over the cell.

An alternative possibility is that of using sintered electrodes. In this case, it is possible, for example, to use three different particle sizes in different layers of the OCE. For instance, a top layer may consist of fine material, a working layer of different fractions, and a gas conduction layer of coarse material (DE 1219553).

A disadvantage of these electrodes is that the electrodes are comparatively thick and heavy—typical thicknesses are approx. 2 mm. The individual layers must be very thin but fault-free. The cost of metal for this kind of electrode is comparatively high, and it has not been possible to produce the electrodes in continuous production processes.

A further disadvantage of this kind of gas diffusion electrodes is that they are very sensitive to pressure variations and cannot be used, for example, in industrial electrolysers since, owing to the construction height, the electrolyte here has a high hydrostatic pressure at the base of an electrolysis cell, which acts on the gas diffusion electrode and thus floods the pore system.

Such electrodes have been produced by scattering application and subsequent sintering or hot pressing. In order to produce multilayer electrodes, a fine material was thus first scattered into a template and smoothed. Subsequently, the other materials were applied in layers one on top of another and then pressed. The production was not only error-prone but also time-consuming and difficult to automate.

EP797265 (Degussa) describes a gas diffusion electrode and a production process for a gas diffusion electrode, which leads to a bimodal pore distribution in the electrode layer. In this case, a catalyst is dispersed with a proton-conducting ionomer. The total porosity of the electrode is 40 to 75% and is composed of small pores with mean diameters up to 500 nm and large pores with mean diameters of 1000 to 2000 nm. The small pores are formed as the solvents vaporize after spraying of the coating dispersion onto a hot membrane. The large pores form as a pore former added beforehand is decomposed or leached out. The mean diameter of the pores can therefore be influenced by the particle size of the pore former used. The bimodal pore distribution is intended to bring about improvement of mass transfer in the electrode layer. Through the macropores, the reaction gas can rapidly pass deep into the electrode layer, and the water of reaction formed can be removed. The small pores then undertake the transport in the ion-conducting polymer as far as the catalyst particles. The distances to be covered here are only short, and so the slowed transport in the small pores does not significantly impair the performance of the electrode. A distinct improvement in transport in the electrode layer over conventional coatings is observed only at total porosities of more than 40%. The supply of the electrocatalyst with the reaction media increases with rising porosity. However, the amount of available electrocatalyst and of the ionomer in the coating decreases with rising porosity. Thus, the attachment of the catalyst to the ionomer and the ionic conductivity of the coating deteriorate with rising porosity, and so the performance data of the electrode layer deteriorates again at porosities above 75%.

This applies to fuel cell electrodes in which the electrocatalyst is dispersed in a proton-conducting polymer.

The document U.S. Pat. No. 6,503,655 describes a hydrophobic gas diffusion electrode with a smooth surface for use in the PEM fuel cell which has pore diameters of 10 to 10 000 nm. The permeability of the electrodes for nitrogen should be greater than $>10^{-6}$ m²/s at standard pressure, preferably $>10^{-5}$ m²/s. For this purpose, the largest pores should have a diameter of more than 100 nm; the diameter should preferably be 500 to 10 000 nm. Also important is a hydrophobic character of the electrodes. This namely prevents water formed in the electrochemical reaction between hydrogen and oxygen from collecting in the pores and blocking them. In order to meet the requirements mentioned, modified carbon papers are used in gas diffusion electrodes, i.e. carbon papers whose surface density has been increased with carbon black or graphite. However, these materials are inadequate with regard to surface smoothness and pore size. U.S. Pat. No. 6,503,655 does not make any statement regarding pore volume or porosity.

BRIEF DESCRIPTION OF THE INVENTION

An embodiment of the present invention is a gas diffusion electrode comprising an electrically conductive carrier, and a porous coating based on an electrochemically active catalyst and a hydrophobic material. The electrode has a first side facing an oxygen-containing gas and a second side facing an alkaline electrolyte. The catalyst comprises a noble metal as a catalytically active component. The hydrophobic material comprises a hydrophobic polymer. The coating comprising the catalyst has a pore volume from 10 to 500 mm³/g, and a pore diameter in the range from 100 to 10,000 nm.

Another embodiment of the present invention is the above gas diffusion electrode, wherein the noble metal is silver or platinum.

Another embodiment of the present invention is the above gas diffusion electrode, wherein the coating comprising the catalyst has a pore volume from 50 to 200 mm³/g, Another embodiment of the present invention is the above gas diffusion electrode, wherein the coating comprising the catalyst has a pore diameter from 600 to 6,000 nm Another embodiment of the present invention is the above gas diffusion electrode, wherein the coating has a unimodal pore distribution.

Another embodiment of the present invention is the above gas diffusion electrode, wherein the coating comprising the catalyst has a porosity from 10 to 70%.

Another embodiment of the present invention is the above gas diffusion electrode, wherein the coating comprising the catalyst has a porosity from 20 to 60%.

Another embodiment of the present invention is the above gas diffusion electrode, wherein the coating comprising the catalyst has a thickness from 20 to 1,000 μm, Another embodiment of the present invention is the above gas diffusion electrode, wherein the coating comprising the catalyst has a thickness from 200 to 600 μm.

Another embodiment of the present invention is the above gas diffusion electrode, wherein the hydrophobic component comprises a hydrophobic polymer.

Another embodiment of the present invention is the above gas diffusion electrode, wherein the hydrophobic polymer comprises a fluorine-substituted polymer, Another embodiment of the present invention is the above gas diffusion electrode, wherein the hydrophobic polymer comprises polytetrafluoroethylene (PTFE).

Another embodiment of the present invention is the above gas diffusion electrode, wherein the electrode has a total loading of the catalytically active component within a range from 5 mg/cm$^2$ to 300 mg/cm$^2$.

Another embodiment of the present invention is the above gas diffusion electrode, wherein the electrode has a total loading of the catalytically active component within a range from 10 mg/cm$^2$ to 250 mg/cm$^2$.

Another embodiment of the present invention is the above gas diffusion electrode, wherein the carrier is based on nickel, silver or a mixture thereof.

Another embodiment of the present invention is the above gas diffusion electrode, wherein the carrier is in the form selected from the group consisting of a mesh fabric, a woven fabric, a knitted fabric, a nonwoven fabric, an expanded metal, or a foam.

Another embodiment of the present invention is the above gas diffusion electrode, wherein the carrier is in the form of a woven fabric.

Yet another embodiment of the present invention is a chloralkali electrolysis apparatus comprising the above gas diffusion electrode as an oxygen-consuming cathode.

Yet another embodiment of the present invention is a fuel cell comprising the above gas diffusion electrode.

Yet another embodiment of the present invention is a metal/air battery comprising the above gas diffusion electrode.

DETAILED DESCRIPTION OF THE INVENTION

It is an object of the present invention to provide an oxygen-consuming electrode for oxygen reduction under alkaline conditions, for example for use in chloralkali electrolysis, which overcomes the above disadvantages and enables a lower operating voltage in chloralkali electrolysis.

The invention with which the stated object is achieved provides a gas diffusion electrode for oxygen reduction in aqueous alkaline media, at least comprising a carrier which, in particular is electrically conductive, and a porous coating based on an electrochemically active catalyst and a hydrophobic material, said electrode having a side facing the oxygen-containing gas and a side facing the alkaline electrolyte, characterized in that the catalyst comprises, as a catalytically active component, a noble metal, especially silver or platinum, preferably silver, and the hydrophobic material comprises a hydrophobic polymer, the coating comprising the catalyst having a pore volume of 10 to 500 mm$^3$/g, preferably of 20 to 300 mm$^3$/g, more preferably of 50 to 200 mm$^3$/g, and a pore diameter in the range from 100 to 10 000 nm, preferably of 200 to 8000 nm, more preferably of 600 to 6000 nm.

It has been found that, surprisingly, apart from the partially hydrophilic and partially hydrophobic nature of the coating, the porosity of the gas diffusion electrode and especially the combination of pore diameter and pore volume are crucial for the performance of the gas diffusion electrode.

Preference is given to a design of the novel gas diffusion electrode, which is characterized in that the coating has a unimodal pore distribution.

Preference is further given to a gas diffusion electrode in which the porosity of the catalytically active coating is from 10 to 70%, preferably from 20 to 60%.

The thickness of the catalytically active coating is from preferably 20 to 1000 μm, more preferably 100 to 800 μm, most preferably 200 to 600 μm.

Preference is further given to a design of the novel gas diffusion electrode in which the hydrophobic component comprises a hydrophobic polymer, preferably a fluorine-substituted polymer, more preferably polytetrafluoroethylene (PTFE).

A further preferred embodiment of the gas diffusion electrode is characterized in that the electrode has a total loading of catalytically active component within a range from 5 mg/cm$^2$ to 300 mg/cm$^2$, preferably from 10 mg/cm$^2$ to 250 mg/cm$^2$.

The novel gas diffusion electrode preferably has a carrier consisting of a material selected from the group of silver, nickel, coated nickel, for example silver-coated nickel, plastic, nickel-copper alloys or coated nickel-copper alloys, for example silver-plated nickel-copper alloys, from which flat textile structures have been produced.

The electrically conductive carrier may in principle be a mesh, nonwoven, foam, woven, braid, expanded metal. The carrier consists preferably of metal, more preferably of nickel, silver or silver-plated nickel. The carrier may have one or more layers. A multilayer carrier may be formed from two or more meshes, nonwovens, foams, wovens, braids or expanded metals arranged one on top of another. The meshes, nonwovens, foams, wovens, braids, expanded metals may be different. For example, they may be of different thickness or different porosity or have a different mesh size. Two or more meshes, nonwovens, foams, wovens, braids, expanded metals may be bonded to one another, for example, by sintering or welding. Preference is given to using a mesh of nickel with a wire diameter of 0.04 to 0.4 mm and a mesh size of 0.2 to 1.2 mm.

The carrier of the gas diffusion electrode is preferably based on nickel, silver or a combination of nickel and silver.

Preference is also given to a form of the gas diffusion electrode in which the carrier is in the form of a mesh, woven, knitted or nonwoven fabric, expanded metal or foam, preferably of a woven fabric.

In principle, the different forms of the NaCl-OCE electrolysis can be distinguished by the way in which the OCEs are incorporated and how this sets the distance between the ion exchange membrane and the OCE. Many cell designs allow a gap between the ion exchange membrane and the OCE, known as the finite gap arrangement. The gap may be 1 to 3 mm; sodium hydroxide solution flows through the gap. In an upright arrangement of the electrode, the flow may be from the top downward (falling-film cell principle; see, for example, WO 2001/057290A2), or from the bottom upward (gas pocket principle; see, for example, DE 4444114A2).

A particular embodiment of the invention is that of polymer-bound electrodes, in which case the gas diffusion electrodes are equipped both with hydrophilic and hydrophobic regions. These gas diffusion electrodes are chemically very stable, especially in the case of use of PTFE (polytetrafluoroethylene).

Regions with a high PTFE content are hydrophobic; no electrolyte can penetrate here, but it can penetrate at sites with a low PTFE content or no PTFE. The catalyst itself must be hydrophilic in this case.

Such PTFE-catalyst mixtures are produced in principle, for example, by use of dispersions of water, PTFE and catalyst. For stabilization of PTFE particles in the aqueous solution, emulsifiers in particular are added, and preference is given to using thickeners for processing of the dispersion. An alternative to this wet production process is production by dry mixing from PTFE powder and catalyst powder.

The inventive OCEs can be produced as described above, by wet or dispersion processes and dry processes. Particular preference is given to the dry production process.

Dispersion processes are selected principally for electrodes with polymeric electrolyte—for example, successfully introduced in the PEM (polymer-electrolyte-membrane) fuel cell or HCl-OCE membrane electrolysis (WO2002/18675).

In the case of use of the OCEs in liquid electrolytes, the dry process gives more suitable OCEs. In the wet or dispersion process, it is possible to dispense with significant mechanical pressing by evaporating the water and sintering the PTFE at 340° C. These electrodes typically have very open pores. However, on the other hand, incorrect drying conditions can rapidly give rise to cracks in the electrode, through which liquid electrolyte can penetrate. Therefore, for applications with liquid electrolyte such as the zinc-air battery or the alkaline fuel cell, the dry process has become established.

In the dry process, the catalyst is mixed intensively with a polymer component (preferably PTFE). The powder mixture can be shaped by pressing, preferably by compression by means of a roller process, to give a film-like structure, which is subsequently applied to the carrier (see, for example, DE 3710168 A2; EP 144002 A2). A likewise employable preferred alternative is described by DE 102005023615 A2; in this case, the powder mixture is scattered onto a carrier and compressed together therewith.

In the dry process, in a particularly preferred embodiment, the electrode is produced from a powder mixture consisting of silver and/or oxides thereof and PTFE. It is likewise possible to use doped silver and/or oxides thereof or mixtures of silver and/or oxides thereof with silver and PTFE. The catalysts and PTFE are, for example, treated in a dry mixing process as described in U.S. Pat. No. 6,838,408 and the powder is compacted to a sheet.

The sheet is subsequently compressed together with a mechanical carrier. Both the sheet formation process and the pressing of sheet and carrier can be effected, for example, by a roller process. The pressing force influences, among other properties, the pore diameter and the porosity of the OCEs. The pore diameter and the porosity influence the performance of the OCEs.

Alternatively, the inventive OCEs can be produced according to DE 10148599, by applying the catalyst powder mixture directly to a carrier.

In this case, the powder mixture consists at least of a catalyst and a binder. The catalyst used is a metal, a metal compound, a nonmetallic compound or a mixture of metals, metal compounds or nonmetallic compounds. The catalyst preferably comprises silver, silver(I) oxide, silver(II) oxide or mixtures thereof. The binder is preferably a hydrophobic polymer, more preferably polytetrafluoroethylene (PTFE). Particular preference is given to using powder mixtures which consist to an extent of 70 to 99.5% by weight of silver(I) oxide, 0 to 15% by weight of silver metal powder and 0.5 to 17% by weight of PTFE. The powder mixture used may also be a mixture as known, for example, from DE 101 30 441 A. In this case, the catalyst was produced in such a way that it is present on the surface of PTFE particles.

The powder mixture may comprise additional further components, for example fillers comprising nickel metal powder, Raney nickel powder, Raney silver powder or mixtures thereof. The powder mixture comprising a catalyst and a binder forms, after application to the carrier and compression with the carrier, an electrochemically active layer of the OCEs.

In a particularly preferred embodiment, the powder mixture is produced by mixing the powder of the catalyst and of the binder and optionally further components. The mixing is accomplished preferably in a mixing apparatus which has rapidly rotating mixing elements, for example beater blades. For mixing of the components of the powder mixture, the mixing elements rotate preferably at a speed of 10 to 30 m/s, or at a rotation rate of 4000 to 8000 rpm. When the catalyst, for example silver(I) oxide, is mixed with PTFE as a binder in such a mixing apparatus, the PTFE is stretched to form a thread-like structure and in this way acts as a binder for the catalyst. After the mixing, the powder mixture is preferably screened. The screening is effected preferably with a screening apparatus equipped with meshes or the like with a mesh size of 0.04 to 2 mm.

The mixing in the mixing apparatus with rotating mixing elements introduces energy into the powder mixture, which greatly heats the powder mixture. In the case of excessive heating of the powder, a deterioration in the OCE performance is observed, and so the temperature during the mixing operation is preferably 35 to 80° C. This can be accomplished by cooling during the mixing, for example by addition of a coolant, for example liquid nitrogen or other inert heat-absorbing substances. A further means of temperature control may be that of interrupting mixing to allow the powder mixture to cool, or by selecting suitable mixing units or altering the fill level in the mixer.

The powder mixture can be applied to the electrically conductive carrier, for example, by scattering. The powder mixture can be scattered onto the carrier, for example, by means of a sieve. Particularly advantageously, a frame-shaped template is placed onto the carrier, the template preferably being selected such that it just encompasses the carrier. Alternatively, the template selected may also be smaller than the area of the carrier. In this case, an uncoated edge of the carrier remains free of electrochemically active coating after the scattering of the powder mixture and the pressing with the carrier. The thickness of the template can be selected according to the amount of powder mixture to be applied to the carrier. The template is filled with the powder mixture. Excess powder can be removed by means of a skimmer. The template is then removed.

In the next step, the powder mixture, in a particularly preferred embodiment, is pressed with the carrier. The pressing can especially be effected by means of rollers. Preference is given to using a roller pair. However, it is also possible to use one roller on an essentially flat substrate, in which case either the roller or the substrate is moved. In addition, pressing can be effected by a compression die. The compression forces are especially 0.01 to 7 kN/cm.

An inventive OCE may in principle have a single-layer or multilayer structure. In order to produce multilayer OCEs, powder mixtures with different compositions and different properties are applied layer by layer to the carrier. The layers of different powder mixtures are preferably not compressed individually with the carrier, but rather first applied in succession and then compressed together with the carrier in one step. For example, a layer of a powder mixture can be applied, which has a higher content of the binder, especially a higher content of PTFE, than the electrochemically active layer. Such a layer with a high PTFE content of 6 to 100% can act as a gas diffusion layer.

Alternatively or additionally, a gas diffusion layer of PTFE can also be applied. A layer with a high PTFE content can be applied, for example, as the lowermost layer directly to the carrier. Further layers with different compositions can be applied to produce the gas diffusion electrode. In the case of multilayer OCEs, the desired physical and/or chemical properties can be established in a controlled manner. These include the hydrophobicity or hydrophilicity of the layer, the electrical conductivity, the gas perviosity. For example, a gradient can be built up in a property by virtue of the measure of the property increasing or decreasing from layer to layer.

The thickness of the individual layers of the OCE can be adjusted by the amount of powder mixture which is applied to the carrier, and by the pressing forces in the course of compression. The amount of the powder mixture applied can be adjusted, for example, via the thickness of the template which is placed onto the carrier in order to scatter the powder mixture onto the carrier. According to the process of DE 10148599, a sheet is produced from the powder mixture. In this case, the thickness or density of the sheet cannot be set independently of one another, since the roller parameters, such as roller diameter, roller distance, roller material, closing force and peripheral speed, have a crucial influence on these parameters.

The compression force in the pressing of a powder mixture or layers of different powder mixtures with the carrier is applied, for example, by roller pressing with a linear pressing force in the range from 0.01 to 7 kN/cm.

The novel oxygen-consuming electrode is preferably connected as a cathode, especially in an electrolysis cell for the electrolysis of alkali metal chlorides, preferably of sodium chloride or potassium chloride, more preferably of sodium chloride.

Alternatively, the oxygen-consuming electrode can preferably be connected as a cathode in a fuel cell, preferably in an alkaline fuel cell.

The invention therefore further provides for the use of the novel oxygen-consuming electrode for reduction of oxygen in the presence of alkaline electrolytes, for example of sodium hydroxide solution, especially in the alkaline fuel cell, for use in drinking water treatment, for example for production of sodium hypochlorite as a bleaching solution, or for use in chloralkali electrolysis, especially for electrolysis of LiCl, KCl or NaCl, or for use as an electrode in a metal/air battery.

The novel OCE is more preferably used in chloralkali electrolysis and here especially in sodium chloride (NaCl) electrolysis.

The invention further provides an electrolysis apparatus, especially for chloralkali electrolysis, comprising a novel inventive gas diffusion electrode as an oxygen-consuming cathode.

Individual terms used for the description of the invention are explained in detail hereinafter:

Hg Porosimetry

The pore analysis to determine porosimetry and pore diameter was undertaken by mercury porosimetry. The measuring instrument used was from Quantachrome, Poremaster 60, with which it was possible to analyse pores from 3 nm to 950 μm.

A significant advantage of mercury porosimetry is the large pore range detectable. The method works as the reverse of gas sorption: mercury, as a nonwetting liquid, is forced into the pores, the large pores being filled first and the smaller pores only at high pressures. The dependence of pressure and pore radius is traditionally described by the Washburn equation. What are called the intrusion and extrusion curves are used to calculate the pore size distribution. Further information, surface area or bulk density can additionally be obtained by this test method.

Porosity

Ratio of solids volume to empty volume in the OCE. Mercury pyenometry is used to determine the apparent density of the OCE (unit: $g/cm^3$). Hg porosimetry gives the volume of mercury which has penetrated (unit: $g/cm^3$), which corresponds to the pore volume of the sample used. The apparent density and the Hg volume which has penetrated can be used to calculate the porosity.

Porosity=Hg Volume Penetrated/Apparent Density

When the calculated porosity has been reported, it is the ratio of the sum of the volume of the added components to the empty volume, which can be calculated from the density of the OCE.

Pore Distribution

Various pore distributions are possible; the inventive OCE is notable for a unimodal pore distribution. "Unimodal" is understood here to mean that the pore diameter has one maximum; in the case of a bimodal distribution, two maxima would be obtained.

The invention is explained in detail hereinafter by the examples, which, however, do not constitute any restriction of the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

The OCEs produced according to the examples which follow were used in chloralkali electrolysis. For this purpose, a laboratory cell was used, which consisted of an anode space and, separated by an ion exchange membrane, a cathode space. In the anode space, a sodium chloride solution of concentration 200-210 g/l was used, in which chlorine was produced at a commercial DSA coated titanium electrode. The cathode space was separated from the anode space by a commercial cation exchange membrane from DuPont, Nafion® 982. Between the OCE and the cation exchange membrane was an electrolyte gap, in which 32% sodium hydroxide solution was pumped in circulation. The OCE was supplied via a gas space with oxygen of concentration greater than 99.5% by volume. Anode, membrane and gas diffusion electrode area were each 100 $cm^2$. The electrolyte temperature was 90° C. The current density of the electrolysis was 4 $kA/m^2$ in all experiments.

The OCEs were produced as follows: 3.5 kg of a powder mixture consisting of 5-7% by weight of PTFE powder, 88% by weight of silver(I) oxide and 5-7% by weight of silver powder (e.g. 331 from Ferro), were mixed in an Eirich R02 mixer, equipped with a star-type fluidizer as a mixing element, at a speed of 6000 rpm, in such a way that the temperature of the powder mixture did not exceed 55° C. This was achieved by stopping the mixing operation and cooling the powder mixture. The mixing was carried out three times for a mixing time of 50 seconds and three times for a mixing time of 60 seconds. After the mixing, the powder mixture was screened with a screen of mesh size 1.0 mm. The screened powder mixture was subsequently applied to an electrically conductive carrier element. The carrier element was a nickel mesh with a wire thickness of 0.14 mm and a mesh size of 0.5 mm. The application was effected with the aid of a 2 mm-thick template, and the powder was applied with a screen having a mesh size of 1.0 mm. Excess powder which projected beyond the thickness of the template was removed by means of a skimmer. After the template has been removed, the carrier with the applied powder mixture is pressed by means of a roller press with a compression force of 0.45 to 0.55 kN/cm. The gas diffusion electrode was removed from the roller press.

The OCEs thus produced were electrochemically reduced in a laboratory cell.

Example 1

(Inventive OCE) BBS 3533-2 Dry Process

The OCE was produced by the dry process, by mixing 5% by weight of silver powder from Ferro, SFQED, 7% PTFE from DYNEON TF2053 and 88% silver oxide from Umicore according to, and then pressing them with a roller press at a force of 0.46 kN/cm. The electrode was used in the above electrolysis cell and operated at 4 kA/m$^2$; the cell voltage was 2.06 V. The mean pore diameter of the electrode was 2096 nm at a pore volume of 115 mm$^3$/g. The porosity was 50%, the density without the mechanical carrier 4.21 g/cm$^3$, the thickness 0.48 mm.

Example 2

(Different Pore Volume) BBS 3543-2 Dry Process

N.B.: 2% by Weight Less PTFE and Higher Pressing Force than Example 1

The OCE was produced by the dry process, by mixing 7% by weight of silver powder from Ferro, SFQED, 5% by weight of PTFE from DYNEON TF2053 and 88% by weight of silver oxide from Umicore according to, and then pressed with a roller press at a force of 0.50 kN/cm. The electrode was used in the above electrolysis cell and operated at 4 kA/m$^2$; the cell voltage was 2.18 V. The mean pore diameter of the electrode was 3042 nm with a pore volume of 78 mm$^3$/g. The porosity was calculated to be 33.8%, the density without the mechanical carrier 4.33 g/cm$^3$, the thickness 0.55 mm.

Example 3

Comparative Example

Use of a Different Silver Powder from Examples 1 and 2

The OCE was produced by the dry process, by mixing 7% by weight of silver powder from Ferro, "311" product, 5% by weight of PTFE from DYNEON TF2053 and 88% by weight of silver oxide from Umicore according to, and then pressed with a roller press at a force of 0.48 kN/cm. The electrode was used in the above electrolysis cell and operated at 4 kA/m$^2$; the cell voltage was 2.47 V. The mean pore diameter of the electrode was 9515 nm with a pore volume of 42 mm$^3$/g. The porosity was 17%, the density without the mechanical carrier 3.81 g/cm$^3$, the thickness 0.57 mm.

| Experiment/Example | Pore diameter [nm] | Pore volume [mm$^3$/g] | Porosity [%] | Cell voltage V @ 4 kA/m$^2$ |
|---|---|---|---|---|
| Example 1 | 2096 | 115 | 50 | 2.06 |
| Example 2 | 3042 | 78 | 36 | 2.18 |
| Example 3 | 9516 | 42 | 17 | 2.47 |

The invention claimed is:

1. A gas diffusion electrode comprising
an electrically conductive carrier, and
a porous coating based on an electrochemically active catalyst and a hydrophobic material,
wherein the electrode has a first side-facing an oxygen-containing gas and a second side facing a liquid alkaline electrolyte,
wherein the catalyst comprises a noble metal as a catalytically active component,
wherein the hydrophobic material comprises a hydrophobic polymer, wherein the hydrophobic polymer comprises polytetrafluoroethylene (PTFE), and
wherein the coating comprising the catalyst has a pore volume from 50 to 200 mm$^3$/g, and a pore diameter in the range from 100 to 10,000 nm.

2. The gas diffusion electrode according to claim 1, wherein the noble metal is silver or platinum.

3. The gas diffusion electrode according to claim 1, wherein the coating comprising the catalyst has a pore diameter from 600 to 6,000 nm.

4. The gas diffusion electrode according to claim 1, wherein the coating has a unimodal pore distribution.

5. The gas diffusion electrode according to claim 1, wherein the coating comprising the catalyst has a porosity from 10 to 70%.

6. The gas diffusion electrode according to claim 1, wherein the coating comprising the catalyst has a porosity from 20 to 60%.

7. The gas diffusion electrode according to claim 1, wherein the coating comprising the catalyst has a thickness from 20 to 1,000 μm.

8. The gas diffusion electrode according to claim 1, wherein the coating comprising the catalyst has a thickness from 200 to 600 μm.

9. The gas diffusion electrode according to claim 1, wherein the electrode has a total loading of the catalytically active component within a range from 5 mg/cm$^2$ to 300 mg/cm$^2$.

10. The gas diffusion electrode according to claim 1, wherein the electrode has a total loading of the catalytically active component within a range from 10 mg/cm$^2$ to 250 mg/cm$^2$.

11. The gas diffusion electrode according to claim 1, wherein the carrier is based on nickel, silver or a mixture thereof.

12. The gas diffusion electrode according to claim 1, wherein the carrier is in the form selected from the group consisting of a mesh fabric, a woven fabric, a knitted fabric, a nonwoven fabric, an expanded metal, or a foam.

13. The gas diffusion electrode according to claim 1, wherein the carrier is in the form of a woven fabric.

14. A chloralkali electrolysis apparatus comprising the gas diffusion electrode according to claim 1 as an oxygen-consuming cathode.

15. A fuel cell comprising the gas diffusion electrode according to claim 1.

16. A metal/air battery comprising the gas diffusion electrode according to claim 1.

17. A gas diffusion electrode comprising
an electrically conductive carrier, and
a porous coating based on an electrochemically active catalyst and a hydrophobic material,
wherein the electrode has a first side facing an oxygen-containing gas and a second side facing a liquid alkaline electrolyte,
wherein the catalyst comprises a noble metal as a catalytically active component,
wherein the hydrophobic material comprises a hydrophobic polymer, wherein the hydrophobic polymer comprises polytetrafluoroethylene (PTFE), and
wherein the coating comprising the catalyst has a pore volume from 78 to 115 mm$^3$/g, and a mean pore diameter in the range from 2,096 to 3,042 nm.

18. A gas diffusion electrode consisting of
an electrically conductive carrier, and
a porous coating based on an electrochemically active catalyst and a hydrophobic material,
wherein the electrode has a first side facing an oxygen-containing gas and a second side facing a liquid alkaline electrolyte,
wherein the catalyst comprises a noble metal as a catalytically active component,
wherein the hydrophobic material comprises a hydrophobic polymer, wherein the hydrophobic polymer comprises polytetrafluoroethylene (PTFE), and
wherein the coating comprising the catalyst has a pore volume from 50 to 200 mm$^3$/g, and a pore diameter in the range from 100 to 10,000 nm.

19. The gas diffusion electrode according to claim 1, wherein the liquid alkaline electrolyte is a sodium hydroxide solution.

20. The gas diffusion electrode according to claim 18, wherein the liquid alkaline electrolyte is a sodium hydroxide solution.

* * * * *